United States Patent
Peitz (10) Patent No.: US 10,323,200 B2
(45) Date of Patent: Jun. 18, 2019

(54) SYSTEM AND METHOD FOR PROVIDING SEPARATION OF NATURAL GAS FROM OIL AND GAS WELL FLUIDS

(71) Applicant: Enservco Corporation, Denver, CO (US)

(72) Inventor: Austin Peitz, Platteville, CO (US)

(73) Assignee: Enservco Corporation, Denver, CO (US)

( * ) Notice: Subject to any disclaimer, the term of this patent is extended or adjusted under 35 U.S.C. 154(b) by 117 days.

(21) Appl. No.: 15/486,120

(22) Filed: Apr. 12, 2017

(65) Prior Publication Data
US 2017/0292360 A1    Oct. 12, 2017

Related U.S. Application Data

(60) Provisional application No. 62/321,613, filed on Apr. 12, 2016.

(51) Int. Cl.
| | | |
|---|---|---|
| *B01D 45/08* | (2006.01) | |
| *C10L 3/10* | (2006.01) | |
| *B01D 53/00* | (2006.01) | |

(52) U.S. Cl.
CPC .............. *C10L 3/101* (2013.01); *B01D 45/08* (2013.01); *B01D 53/002* (2013.01); *C10L 3/106* (2013.01);
(Continued)

(58) Field of Classification Search
CPC ............ B01D 17/0211; B01D 17/0214; B01D 17/0208; B01D 17/12; B01D 21/0039; B01D 17/02; B01D 19/0057; B01D 19/0063; B01D 21/302; B01D 53/263; B01D 17/00; B01D 17/005; B01D 17/042; B01D 19/00; B01D 19/0036; B01D 19/0042; B01D 21/0042; B01D 21/009; B01D 21/10; B01D 45/08; C10G 2300/4062; C10G 2/32; C10G 31/06; C10G 47/00; C10G 5/04; C10L 3/10; C10L 3/102
See application file for complete search history.

(56) References Cited

U.S. PATENT DOCUMENTS

| | | |
|---|---|---|
| 1,522,120 A | 1/1925 | Halder |
| 1,527,740 A | 2/1925 | Lipshitz |

(Continued)

FOREIGN PATENT DOCUMENTS

| | | |
|---|---|---|
| CA | 1294564 C | 1/1992 |
| CA | 1301639 C | 5/1992 |

(Continued)

OTHER PUBLICATIONS

Armstrong International, Flo-Rite-Temp Bulletin No. AY-408-H, dated May 2002.
(Continued)

*Primary Examiner* — Sharon Pregler
(74) *Attorney, Agent, or Firm* — Faegre Baker Daniels LLP (57) ABSTRACT

A system for heating water for an oil and gas well treatment system utilizing raw natural gas from an oil and gas well. The system includes a separation assembly to remove liquids from the raw natural gas, wherein at least a portion of heated water from a frac water heater is passed through the separation assembly to prevent freezing therein.

20 Claims, 6 Drawing Sheets

(52) U.S. Cl.
CPC .......... B01D 2256/245 (2013.01); B01D 2257/7022 (2013.01); B01D 2257/80 (2013.01); C10L 2290/06 (2013.01); C10L 2290/543 (2013.01); C10L 2290/567 (2013.01)

(56) References Cited

U.S. PATENT DOCUMENTS

| | | | |
|---|---|---|---|
| 1,660,018 A | 2/1928 | Adolf | |
| 1,886,448 A | 11/1932 | Smith et al. | |
| 2,065,789 A | 12/1936 | Bolsinger | |
| 2,122,900 A | 7/1938 | Uhrmacher | |
| 2,395,258 A | 2/1946 | Drake | |
| 2,410,900 A | 11/1946 | Radbill | |
| 2,486,141 A | 10/1949 | Folio | |
| 2,631,017 A | 3/1953 | Gibson et al. | |
| 2,645,463 A | 7/1953 | Stearns | |
| 2,892,509 A | 6/1959 | Baker et al. | |
| 2,922,441 A | 1/1960 | Ferdinand | |
| 2,969,451 A | 1/1961 | Logan | |
| 3,106,915 A | 10/1963 | Key, Jr. | |
| 3,159,345 A | 12/1964 | Osburn | |
| 3,232,336 A | 2/1966 | Leslie et al. | |
| 3,379,250 A | 4/1968 | Matthews et al. | |
| 3,411,571 A | 11/1968 | Lawrence | |
| 3,421,583 A | 1/1969 | Koons | |
| 3,454,095 A | 7/1969 | Messenger et al. | |
| 3,572,437 A | 3/1971 | Coutret, Jr. et al. | |
| 3,581,822 A | 6/1971 | Cornelius | |
| 3,670,807 A | 6/1972 | Muller | |
| 3,685,542 A | 8/1972 | Daughirda | |
| 3,698,430 A | 10/1972 | Basting et al. | |
| 3,768,257 A | 10/1973 | Neuffer | |
| 3,816,151 A | 6/1974 | Podlas | |
| 3,938,594 A | 2/1976 | Rhudy et al. | |
| 3,980,136 A | 9/1976 | Plummer et al. | |
| 3,982,910 A | 9/1976 | Houseman et al. | |
| 4,044,727 A | 8/1977 | Rychen et al. | |
| 4,076,628 A | 2/1978 | Clampitt | |
| 4,137,182 A | 1/1979 | Golinkin | |
| 4,175,697 A | 11/1979 | Dreibelbis | |
| 4,421,062 A | 12/1983 | Padilla et al. | |
| 4,518,568 A | 5/1985 | Shannon | |
| 4,574,775 A | 3/1986 | Lutzen et al. | |
| 4,576,005 A | 3/1986 | Force | |
| 4,658,803 A | 4/1987 | Ball et al. | |
| 4,737,100 A | 4/1988 | Schnell et al. | |
| 4,753,220 A | 6/1988 | Lutzen et al. | |
| 4,807,701 A | 2/1989 | Hall et al. | |
| 4,830,111 A | 5/1989 | Jenkins et al. | |
| 4,966,100 A | 10/1990 | Fournier et al. | |
| 4,977,885 A | 12/1990 | Herweyer et al. | |
| 5,018,396 A | 5/1991 | Penny | |
| 5,038,853 A | 8/1991 | Callaway et al. | |
| 5,183,029 A | 2/1993 | Ranger | |
| 5,295,820 A | 3/1994 | Bilcik et al. | |
| 5,445,181 A | 8/1995 | Kuhn et al. | |
| 5,464,005 A | 11/1995 | Mizrahi | |
| 5,467,799 A | 11/1995 | Buccicone et al. | |
| 5,494,077 A | 2/1996 | Enoki et al. | |
| 5,520,165 A | 5/1996 | Khinkis et al. | |
| 5,551,630 A | 9/1996 | Enoki et al. | |
| 5,586,720 A | 12/1996 | Spiegel et al. | |
| 5,588,088 A | 12/1996 | Flaman | |
| 5,623,990 A | 4/1997 | Pirkle | |
| 5,656,136 A | 8/1997 | Gayaut et al. | |
| 5,765,546 A | 6/1998 | Mandeville et al. | |
| 5,875,843 A | 3/1999 | Hill | |
| 5,893,341 A | 4/1999 | Cox | |
| 5,924,391 A | 7/1999 | Baker et al. | |
| 5,979,549 A | 11/1999 | Meeks | |
| 6,024,290 A | 2/2000 | Dosani et al. | |
| 6,129,148 A | 10/2000 | Meeks | |
| 6,470,836 B1 | 10/2002 | Manley et al. | |
| 6,776,153 B1 | 8/2004 | Walker et al. | |
| 6,990,930 B2 | 1/2006 | Sarkar | |
| 7,048,051 B2 | 5/2006 | McQueen | |
| 7,298,968 B1 | 11/2007 | Boros et al. | |
| 7,477,836 B2 | 1/2009 | White et al. | |
| 7,575,672 B1 | 8/2009 | Gilmore | |
| 7,681,536 B2 | 3/2010 | Kaupp | |
| 7,744,007 B2 | 6/2010 | Beagen et al. | |
| 8,021,537 B2 | 9/2011 | Sarkar et al. | |
| 8,044,000 B2 | 10/2011 | Sullivan et al. | |
| 8,171,993 B2 | 5/2012 | Hefley | |
| 8,205,674 B2 | 6/2012 | Shurtleff | |
| 8,262,866 B2 | 9/2012 | Lockhart et al. | |
| 8,286,595 B2 | 10/2012 | Cerney et al. | |
| 8,312,924 B2 | 11/2012 | Smith | |
| 8,534,235 B2 | 9/2013 | Chandler | |
| 8,567,352 B2 | 10/2013 | Kaupp | |
| 8,733,437 B2 | 5/2014 | Ware et al. | |
| 8,739,875 B2 | 6/2014 | Hefley | |
| 8,905,138 B2 | 12/2014 | Lundstedt et al. | |
| 9,057,517 B1 | 6/2015 | Briggs | |
| 9,683,428 B2 | 6/2017 | Peitz | |
| 2002/0052298 A1 | 5/2002 | Chowdhary et al. | |
| 2003/0178195 A1 | 9/2003 | Agee et al. | |
| 2005/0023222 A1 | 2/2005 | Baillie | |
| 2006/0090798 A1 | 5/2006 | Beagen et al. | |
| 2007/0056726 A1 | 3/2007 | Shurtleff | |
| 2007/0062704 A1 | 3/2007 | Smith | |
| 2007/0170273 A1 | 7/2007 | McIllwain | |
| 2008/0029267 A1 | 2/2008 | Shampine et al. | |
| 2009/0023614 A1 | 1/2009 | Sullivan et al. | |
| 2009/0029303 A1 | 1/2009 | Wiggins et al. | |
| 2009/0056645 A1 | 3/2009 | Hobbs et al. | |
| 2009/0060659 A1 | 3/2009 | Wallace | |
| 2009/0308613 A1 | 12/2009 | Smith | |
| 2010/0000368 A1 | 1/2010 | Chandler | |
| 2010/0031506 A1 | 2/2010 | Hartwig et al. | |
| 2010/0294494 A1* | 11/2010 | Hefley | E21B 43/26 166/272.2 |
| 2011/0073789 A1 | 3/2011 | Yeary et al. | |
| 2011/0198083 A1 | 8/2011 | Lockhart et al. | |
| 2012/0094242 A1 | 4/2012 | Streisel et al. | |
| 2012/0193093 A1 | 8/2012 | James | |
| 2013/0139694 A1 | 6/2013 | Hughes et al. | |
| 2013/0145996 A1 | 6/2013 | Cooper et al. | |
| 2013/0228330 A1 | 9/2013 | Loree et al. | |
| 2013/0288187 A1 | 10/2013 | Imgrundt et al. | |
| 2013/0312972 A1 | 11/2013 | Lundstedt et al. | |
| 2014/0026824 A1 | 1/2014 | Romocki et al. | |
| 2014/0027386 A1 | 1/2014 | Munisteri | |
| 2014/0083408 A1 | 3/2014 | Berg et al. | |
| 2014/0096974 A1 | 4/2014 | Coli et al. | |
| 2014/0130498 A1 | 5/2014 | Randolph | |
| 2014/0144393 A1 | 5/2014 | Chandler | |
| 2014/0144394 A1 | 5/2014 | Chandler | |
| 2014/0144641 A1 | 5/2014 | Chandler | |
| 2014/0151047 A1 | 6/2014 | Chandler | |
| 2014/0190698 A1 | 7/2014 | Mays | |
| 2014/0262735 A1 | 9/2014 | Hawks | |
| 2016/0053580 A1 | 2/2016 | Briggs | |
| 2016/0053581 A1 | 2/2016 | Briggs | |
| 2016/0053991 A1 | 2/2016 | Briggs | |
| 2016/0138826 A1* | 5/2016 | La Porte | F24H 1/06 122/17.1 |
| 2018/0016873 A1 | 1/2018 | Peitz | |

FOREIGN PATENT DOCUMENTS

| | | |
|---|---|---|
| CA | 2499699 A1 | 3/2006 |
| CA | 2706399 A1 | 11/2011 |
| CA | 2792323 A1 | 4/2014 |
| DE | 2814886 C2 | 10/1979 |
| EP | 0767347 A1 | 4/1997 |
| EP | 1484554 A1 | 12/2004 |
| JP | 2911989 B2 | 4/1992 |
| SU | 1672110 A | 5/1989 |
| WO | 2010018356 A2 | 2/2010 |
| WO | 2011034679 A2 | 3/2011 |
| WO | 2012100320 A1 | 8/2012 |
| WO | 2013016685 A1 | 1/2013 |
| WO | 2013067138 A1 | 5/2013 |

(56) References Cited

FOREIGN PATENT DOCUMENTS

| WO | 2013148342 A1 | 10/2013 |
|---|---|---|
| WO | 2014006165 A2 | 1/2014 |
| WO | 2014053056 A1 | 4/2014 |
| WO | 2014075071 A2 | 5/2014 |
| WO | 2014096030 A1 | 6/2014 |
| WO | 2014197969 A1 | 12/2014 |

OTHER PUBLICATIONS

Austin Peitz Statement signed Feb. 5, 2016 with Transcript of Rule 30(b)(6) Deposition of Heat Waves Hot Oil Service, LLC, Austin Peitz, dated Oct. 23, 2014, U.S. District Court for North Dakota, Case No. 4:13-cv-010-DLH-CSM, with Exhibits.

Bradley, et al., "Thermal Degradation of Guar Gum," Carbohydrate Polymers, 1989, vol. 10, pp. 205-214.

Cassinat, et al., "Optimizing Waterflood Performance by Utilizing Hot Water Injection in a High Paraffin Content Reservoir," SPE/DOE Improved Recovery Symposium, Apr. 13-17, 2002, Tulsa, OK, SPE 75141.

Chan, Keng Seng et al., "Oilfield Chemistry at thermal Extremes," Oilfield Review, (Autumn 2006), pp. 4-17.

Consulting Agency Trade (C.A.T.) GmbH, "Hydration Unit mising unit for preparation fracturing fluids," dated Mar. 2008.

Crawford, "Technology in the Service Sector Water Super-Heating Technology Slashes Energy Costs," (available at http://www.wellservicingmagazine.com/featured-articles/2012/11/technology-in-the-service-sector-water-super-heating-technology-slashes-energy-costs/), dated 2012.

HPAC webpage, "Optimizing the Performance of Radiant Heating Systems," (https://hpac.com/heating/optimizing-performance-radiant-heating-systems), dated Jul. 1, 2008.

Kirilov, et al., "A New Hydraulic Fracturing Package Fit for Artic Conditions Improves Operational Efficiency and Fracture Conductivity and Enhances Production in Western Siberia," 2006 SPE Russian Oil and Gas Technical Conference and Exhibition, Oct. 3-6, 2006, Moscow, Russia, SPE102623.

Kormax HotShot (TM) Inline Steam Heater (web archive: http://kormax.com/products/inline_steam_heater.htoml) dated Apr. 20, 2008.

McShan, "SPD18 Oil-Fired Frac Water Heating Unit Primary and Secondary Combustion air System," Chandler Mfg. Inc., 2008.

PSNC Energy "Commercial and Industrial Facilities Go 'Tankless'," available on the internet at least as early as Nov. 18, 2006, Internet Archive Wayback Machine, http://web.archive.org/web/20061118194825/http://www.psncenergy.com/en/small-to-medium-business/business-sectors/hospitality/commercial-industrial-facilities-go-tankless.htm.

Schumacher et al., "Subzero Hydraulic Fracturing: A Field Case Study, Lisburne Carbonate Reservoir, Prudhoe Bay Unit, North Slope, Alaska," 56th California Regional Meeting of the Society of Petroleum Engineers, Apr. 2-4, 1986, Oakland, CA SPE 15068.

Vining et al., "Reversible thermodynamic Cycle for AMTEC Power Conversion," Proceedings of the 27th Intersociety Energy Conversion Engineering Conference, IECEC—92, Aug. 3, 1992, pp. 3.123-3.127.

Webpage describing Firestorm TM Direct-Contact Water Heaters, captured on May 11, 2008 by the Internet Archive, availalbe at brochure http://web.archive.org/web.20080511165612/http://heatec.com/products_concrete/firestorm/firestorm.htm.

Zughbi, Habib D., et al., "Mixing in Pipelines with Side and Opposed Tees," Ind. Eng. Chem. Res., American Chemical Society, (2003), 42 (21), pp. 5333-5334 (Abstract only).

* cited by examiner

SYSTEM AND METHOD FOR PROVIDING SEPARATION OF NATURAL GAS FROM OIL AND GAS WELL FLUIDS

RELATED APPLICATION

The present application claims the benefit of U.S. Provisional Patent Application No. 62/321,613 filed on Apr. 12, 2016 and entitled "System And Method For Providing Separation Of Natural Gas From Oil And Gas Well Fluids," the content of which is incorporated herein by reference in its entirety.

FIELD

The one or more present inventions are related to a method and apparatus for separating natural gas from fluids generated from an oil and gas well, wherein heated liquid from a well enhancement/treatment operation is used in a separator assembly.

BACKGROUND

Various activities are performed on oil and gas wells to improve the performance characteristics of the wells. By way of example, as part of a hydraulic fracturing process, water is heated and is used in the hydraulic fracturing procedure. However, there is a need for additional methods and devices that allow heating of the water utilizing the readily available extracted raw natural gas.

SUMMARY

It is to be understood that the one or more present inventions include a variety of different versions or embodiments, and this Summary is not meant to be limiting or all-inclusive. This Summary provides some general descriptions of some of the embodiments, but may also include some more specific descriptions of other embodiments.

In at least one embodiment of the one or more present inventions, a system is provided for regulating the flow of raw natural gas and for treating the raw natural gas using heated liquid, such as heated water from a frac water heater. The system includes a separation assembly to remove and/or aid in the separation of water and natural gas liquids (NGLs), including, but not limited to, ethane, propane, butane, isobutene, and pentane, from the gas, wherein at least a portion of heated water from the water heater is passed through the separation assembly to prevent freezing therein and/or to otherwise regulate the temperature of the contents therein.

In at least one embodiment, a frac water heating system including a gas separator for treating a raw natural gas conveyed via raw natural gas piping from a raw natural gas supply is provided, the frac water heating system comprising: a separation assembly including at least a separation vessel, the separation vessel defining an internal chamber having an upper end and a lower end, the separation vessel having a gas inlet configured for interconnection to the raw natural gas supply piping, the separation vessel having and a gas outlet, wherein the separation vessel is configured such that raw natural gas entering through the gas inlet is treated within the separation vessel such that at least some liquid associated with the raw natural gas collects in the lower end of the internal chamber and a treated gas travels to and out of the gas outlet; a frac water heater having a water inlet and a heated water outlet, the frac water heater having a heater configured to heat water passing from the water inlet to the heated water outlet, the heater configured to utilize at least a portion of the treated gas exiting the separation vessel; gas conveyance piping located between the gas outlet of the separation vessel and a gas inlet to the heater of the frac water heater; and water conveyance piping in fluid communication with the heated water outlet of the frac water heater and passing through the lower end of the separation vessel, the water conveyance piping located in the lower end of the separation vessel configured to heat liquid collected within the lower end of the internal chamber of the separation vessel.

The frac water heating system of paragraph [0006], wherein the separation assembly further comprises a volume tank defining an internal chamber, wherein the volume tank is situated along the gas conveyance piping downstream of the gas outlet of the separation vessel and upstream of the gas inlet to the heater of the frac water heater, wherein the volume tank includes a volume tank gas inlet configured to receive the treated gas from the gas conveyance piping, the internal chamber of the volume tank configured to temporarily hold gas and/or liquids therein and optionally to reduce a pressure of the treated gas before the treated gas exits through a volume tank gas outlet which is in fluid communication with the gas conveyance piping leading to the gas inlet of the frac water heater.

The frac water heating system of paragraphs [0006] to [0007], further comprising water conveyance piping between the separation vessel hot water outlet and the volume tank hot water inlet for conveying hot water from the separation vessel to the volume tank.

The frac water heating system of paragraphs [0006] to [0008], further comprising a first valve associated with the water conveyance piping and located upstream of a hot water inlet to the separation vessel.

The frac water heating system of paragraphs [0006] to [0009], further comprising a second valve associated with the water conveyance piping and located between the separation vessel and the volume tank.

The frac water heating system of paragraphs [0006] to [00010], wherein the separation assembly in located on a mobile platform.

The frac water heating system of paragraphs [0006] to [00011], further comprising additional water conveyance piping located exterior to the separation vessel and the volume tank, wherein the additional water conveyance piping is located on the mobile platform and extends from a location upstream of the separation vessel to downstream of the volume tank.

The frac water heating system of paragraphs [0006] to [00012], wherein the mobile platform comprises at least one of a truck, a trailer, and a skid.

In at least one embodiment, a separation assembly to treat a raw natural gas conveyed via raw natural gas supply piping from an oil and gas well, the separation assembly for use in combination with a frac water heater associated with a hydraulic fracturing treatment process of a subsurface geologic feature, the frac water heater including a frac water heater gas inlet, the separation assembly comprising: a separation vessel, the separation vessel defining an internal chamber having an upper end and a lower end, the separation vessel having a gas inlet configured for connection to the raw natural gas supply piping and a gas outlet for releasing partially treated gas, the separation vessel including a separation vessel hot water inlet and a separation vessel hot water outlet with separation vessel internal piping in the lower end of the internal chamber, the separation vessel
} internal piping interconnecting the separation vessel hot water inlet and the separation vessel hot water outlet; and a volume tank including a volume tank gas inlet configured to receive the partially treated gas exiting the gas outlet of the separation vessel, the volume tank including a volume tank internal chamber having an upper end and a lower end, the volume tank including a volume tank hot water inlet and a volume tank hot water outlet with volume tank internal piping in the lower end of the volume tank internal chamber, the volume tank internal piping interconnecting the volume tank hot water inlet and the volume tank hot water outlet, the volume tank including a volume tank gas outlet to release treated gas.

The separation assembly of paragraph [00014], further comprising gas piping extending between the volume tank gas outlet and the frac water heater gas inlet.

The separation assembly of paragraphs [00014] to [00015], further comprising hot water piping interconnecting the separation vessel hot water outlet to the volume tank hot water inlet for conveying hot water between the separation vessel and the volume tank.

The separation assembly of paragraphs [00014] to [00016], further comprising a valve in line with the separation vessel hot water inlet and located upstream of the separation vessel hot water inlet.

The separation assembly of paragraphs [00014] to [00017], further comprising a valve in line with the volume tank hot water inlet and located between the separation vessel and the volume tank.

The separation assembly of paragraphs [00014] to [00018], wherein the separation vessel and the volume tank are both located on a mobile platform.

The separation assembly of paragraphs [00014] to [00019], further comprising water conveyance piping located exterior to the separation vessel and the volume tank, wherein the water conveyance piping is located on the mobile platform and extends from a location upstream of the separation vessel to downstream of the volume tank.

The separation assembly of paragraphs [00014] to [00020], wherein the mobile platform comprises at least one of a truck, a trailer, and a skid.

In yet another embodiment, a method of heating frac water using natural gas is provided, the method comprising: passing water through a frac water heater from a water inlet to a heated water outlet; heating the water with a heater in the frac water heater configured to heat water passing from the water inlet to the heated water outlet, the frac water heater utilizing treated gas received through a gas inlet as fuel; passing raw natural gas through a separation assembly comprising at least a separation vessel, wherein the separation vessel defines an internal chamber having an upper end and a lower end, the separation vessel configured such that at least a portion of liquid within the raw natural gas collects in the lower end of the internal chamber and a partially treated gas travels out of the separation vessel; passing at least a portion of the partially treated gas exiting the separation assembly to the gas inlet of the frac water heater; and passing at least a portion of heated water exiting the heated water outlet through the lower end of the separation vessel to heat liquid collected within the lower end of the internal chamber.

The method of paragraph [00022], further comprising passing heated water from the separation vessel through a pipe within a volume tank, the volume tank forming a portion of the separation assembly.

The method of paragraphs [00022] to [00023], further comprising water conveyance piping located exterior to the separation vessel and the volume tank, wherein the water conveyance piping is located on a mobile platform, the water conveyance piping extending from a location upstream of the separation vessel to downstream of the volume tank.

The method of paragraphs [00022] to [00024], wherein the separation vessel includes a plurality of mixing plates and/or screens extending into the internal chamber, and wherein the raw natural gas passes through, around, adjacent and/or otherwise contacts the plurality of mixing plates and/or screens.

Various components may be referred to herein as "operably associated." If used herein, "operably associated" refers to components that are linked together in operable fashion, and encompasses embodiments in which components are linked directly, as well as embodiments in which additional components are placed between the two linked components.

As used herein, gas conveyance piping includes piping and fittings.

As used herein, water conveyance piping includes piping and fittings.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Various embodiments of the one or more present inventions are set forth in the attached figures and in the Detailed Description as provided herein and as embodied by the claims. It should be understood, however, that this Summary does not contain all of the aspects and embodiments of the one or more present inventions, is not meant to be limiting or restrictive in any manner, and that the invention(s) as disclosed herein is/are understood by those of ordinary skill in the art to encompass obvious improvements and modifications thereto.

Additional advantages of the one or more present inventions will become readily apparent from the following discussion, particularly when taken together with the accompanying drawings.

BRIEF DESCRIPTION OF THE DRAWINGS

To further clarify the above and other advantages and features of the one or more present inventions, a more particular description of the one or more present inventions is rendered by reference to specific embodiments thereof which are illustrated in the appended drawings. It should be appreciated that these drawings depict only typical embodiments of the one or more present inventions and are therefore not to be considered limiting of its scope. The one or more present inventions are described and explained with additional specificity and detail through the use of the accompanying drawings in which.

The drawings are not necessarily to scale.

DETAILED DESCRIPTION

One or more embodiments of the one or more present inventions described herein include a system for heating water (or other liquid) for an oil and gas well system utilizing raw natural gas from an oil and gas well. Accordingly, in at least one embodiment, the system includes a separation assembly to remove NGLs and water from the raw natural gas and at least a portion of heated water from the frac water heater is passable through a separation assembly to prevent freezing therein.

Figure 1:
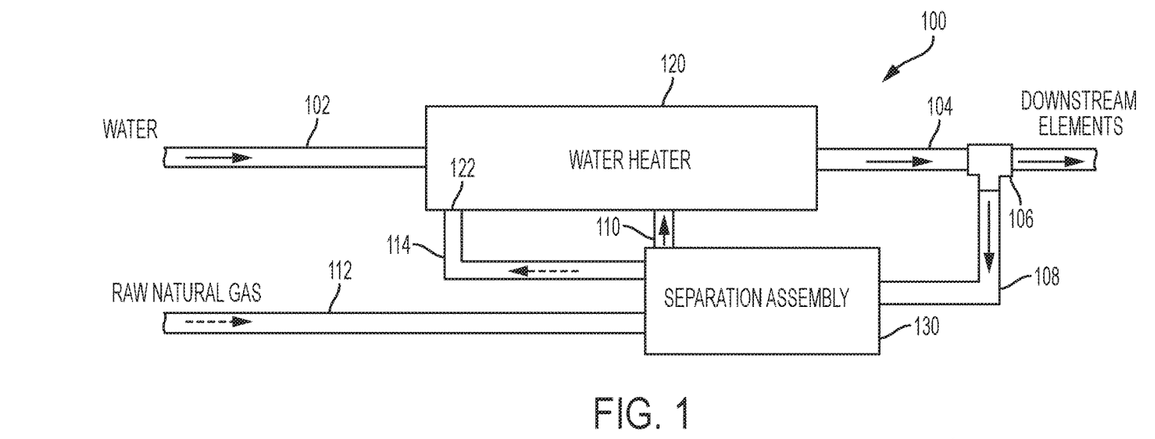
FIG. 1 is a schematic of a system in accordance with an embodiment of the one or more present inventions.

Referring now to FIG. 1, an overall schematic of a portion of the oil/gas well treatment system including the water heating system 100 in accordance with an embodiment of the invention is shown. Here, it is to be understood that an oil/gas well treatment system is used as an example, and is not be interpreted as limiting the uses of the technology. For example, the system and methods described herein are applicable to other systems requiring heated liquids, including liquids other than water, such as water with additives and oil. Within the oil and gas well industry, embodiments described herein are at least applicable to heating liquids, such as water, used in hydraulic fracturing of a subsurface geologic formation that is expected to contain oil and/or gas.

As shown in FIG. 1, the water heater 120 of the water heating system 100 receives water from a water source by piping 102. As used herein, pipe or piping (including primary and lateral pipes) includes liquid conveyance devices or conduits of a variety of material types (e.g., metal, plastic, rubber, fabric, composites, and ceramic), and further include hose, tubing and the like, as well as combinations of the foregoing. The water source may be any convenient source, for example, a storage tank or storage vessel, a tanker truck, a well, a lake, a pond, a river or the like and may also include portions of water that were previously heated and are being conveyed or returned from a storage or frac tank to the water heater 120. The water heater 120 may take various forms, for example, one or more burners configured to heat water that is conveyed through one or more coils or a direct fire heater; however the invention is not limited to such types of heaters. In addition, and by way of non-limiting example, as those skilled in the art will appreciate, a water heater 120 may be located on a truck or trailer. The water heater 120 includes a gas intake 122 into which treated natural gas is received. The treated gas is burned within the water heater 120 and the water passing therethrough is heated, as is known in the art. The heated water is then passed through piping 104 to frac tanks or other downstream elements. By way of example and not limitation, downstream elements may include one or more liquid storage members, such as one or more of a tank (e.g., a buffer tank), container, vessel, pond (e.g., membrane lined pond) or combinations of the like for storing heated water until it is used. Alternatively, the heated water may enter a water main, pipe, liquid conveyance structure, and/or storage structure where it is subsequently transmitted to equipment associated with a well treatment process, such as hydraulic fracturing operation.

It has been recognized by the present inventor that the gas extracted from a wellhead potentially provides an abundant supply of natural gas for the water heater 120 and eliminates the need for tanks or other supplies of treated gas, such as from a vendor of processed gas that trucks the processed gas to the project site. However, such extracted raw gas from a wellhead is generally not suitable for delivery as raw gas directly to the water heater 120. More particularly, product generated from an oil and gas well typically includes liquids produced up the well tubing, and raw natural gas produced up the well casing, wherein the raw natural gas may, nonetheless, still include some amount of liquids. Moreover, raw natural gas commonly exists in mixtures with other hydrocarbons; principally ethane, propane, butane, and pentanes. In addition, raw natural gas contains water vapor, hydrogen sulfide ($H_2S$), carbon dioxide, helium, nitrogen, and other compounds. The NGLs, water vapor and other compounds in the extracted raw gas must be removed before the natural gas may be used in the water heater 120. In addition, the gas pressure of the "natural gas supply" (as described below) exiting the wellhead may be greater than 300 psi, and could be at pressures of up to 10,000 psi or even greater, wherein gas pressure associated with the wellhead can be expected to potentially fluctuate. In one embodiment, if the gas pressure at the wellhead is greater than 300 psi, then the gas pressure may be regulated lower at or near the wellhead, or at least at a location situated between the wellhead and the gas inlet 136 of the separation assembly 130, described in detail below. Therefore, one or more pressure regulators are preferably situated to limit pressures in excess of 300 psi from reaching the gas inlet 136. Since some wells may have gas pressures less than 300 psi, in at least one embodiment the gas entering the gas inlet 136 will not be regulated downward to a lower pressure; however, the pressure may be regulated downward before gas is combusted in the water heater 120, such as, by way of non-limiting example, to a pressure of about 100 psi. Indeed, even if gas pressures at the wellhead are lower than 100 psi, then such gas may be received at the gas inlet 136, treated, and used at the water heater 120, even at pressures as low as 10 psi.

To address gas quality issues, the water heating system 100 includes a separation assembly 130 which receives the raw gas from a natural gas supply via piping 112, processes the raw gas into a treated gas at a desired pressure, and delivers the treated gas to the gas inlet 122 via piping 114. As used herein, "natural gas supply" includes raw gas that may be directly piped from the wellhead or stored, for example, in one or more storage tanks, in raw form between delivery from the wellhead and the separation assembly 130. The natural gas supply that includes raw gas may contain some portion of liquids but is anticipated to be predominantly gases. Nonetheless, the separation assembly is provided to treat and/or condition the gas for use by the water heater 120 and/or other systems that can use the treated gas as fuel, as described further herein.

Figure 2:
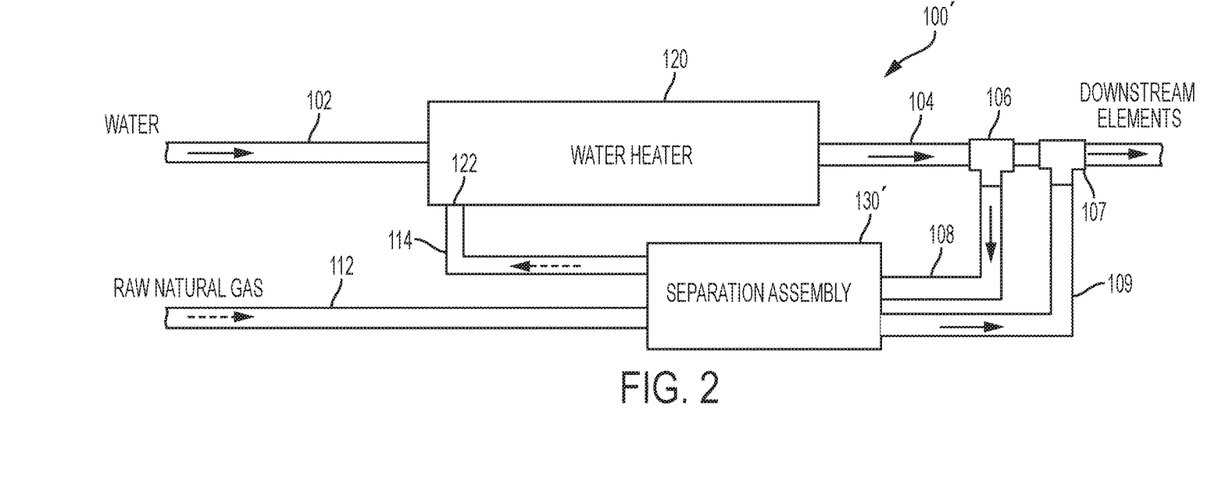
FIG. 2 is a schematic of another system in accordance with an embodiment of the one or more present inventions.
Figure 3:
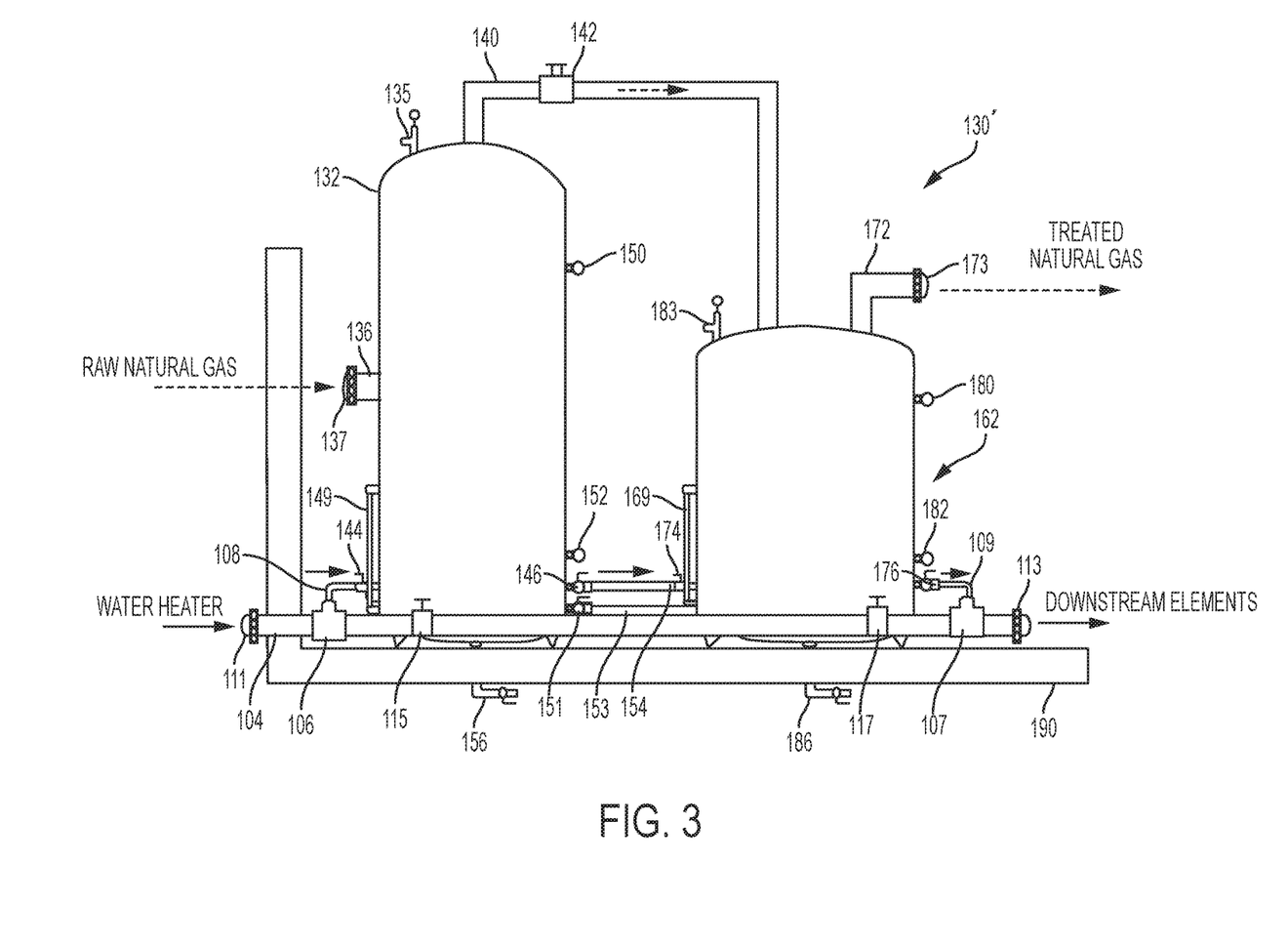
FIG. 3 is another schematic of an embodiment of a separation assembly of the system depicted in FIG. 2.
Figure 5:
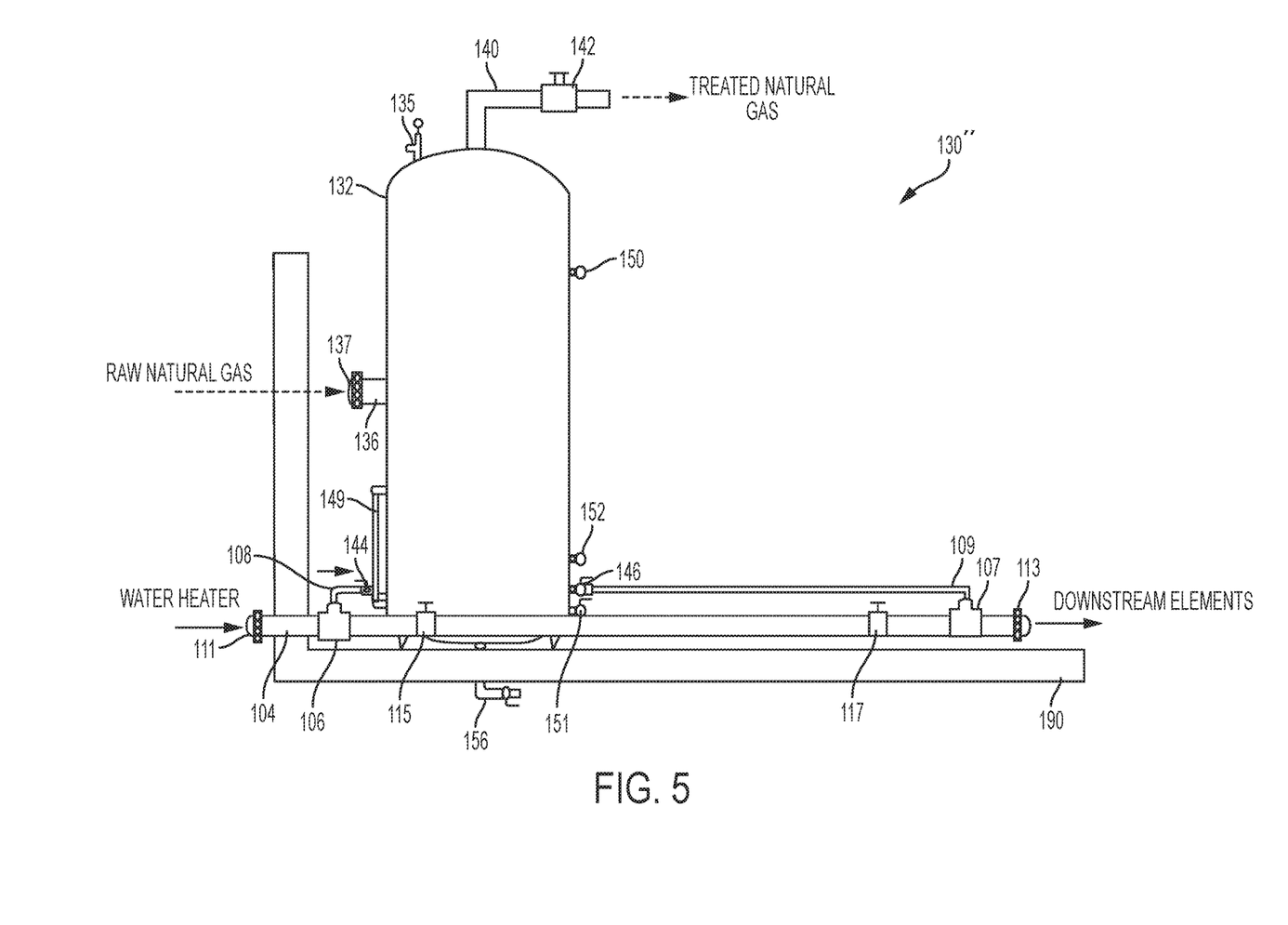
FIG. 5 is another schematic of an embodiment of a separation assembly without a volume tank.

The inventor of embodiments described herein has further recognized the need for a heat source within the separation assembly 130. To provide such a heat source, the water heating system 100 includes a connection, such as T-connection 106 along the downstream piping 104 which peels off a portion of the heated water and delivers it via piping 108 to the separation assembly 130. As best seen in FIGS. 3 and 5, the amount of flow of heated water through the downstream piping 104 may be regulated, such as by valves 115 and 117. After flowing through T-connection 106, the heated water passes through the separation assembly 130, as described in more detail hereinafter, and then may be returned to the water heater 120 via piping 110. As an alternative, in the embodiment of the water heating system 100' illustrated in FIG. 2, water exiting the separation assembly 130 is returned to the downstream piping 104 via a T-connector 107 and piping 109 extending from the separation assembly 130' to the T-connector 107. It is recognized that the described embodiments illustrate two configurations for utilizing the water exiting the separation assembly 130, however, the one or more present inventions are not limited thereto and the exiting water may be otherwise utilized.

Figure 4:
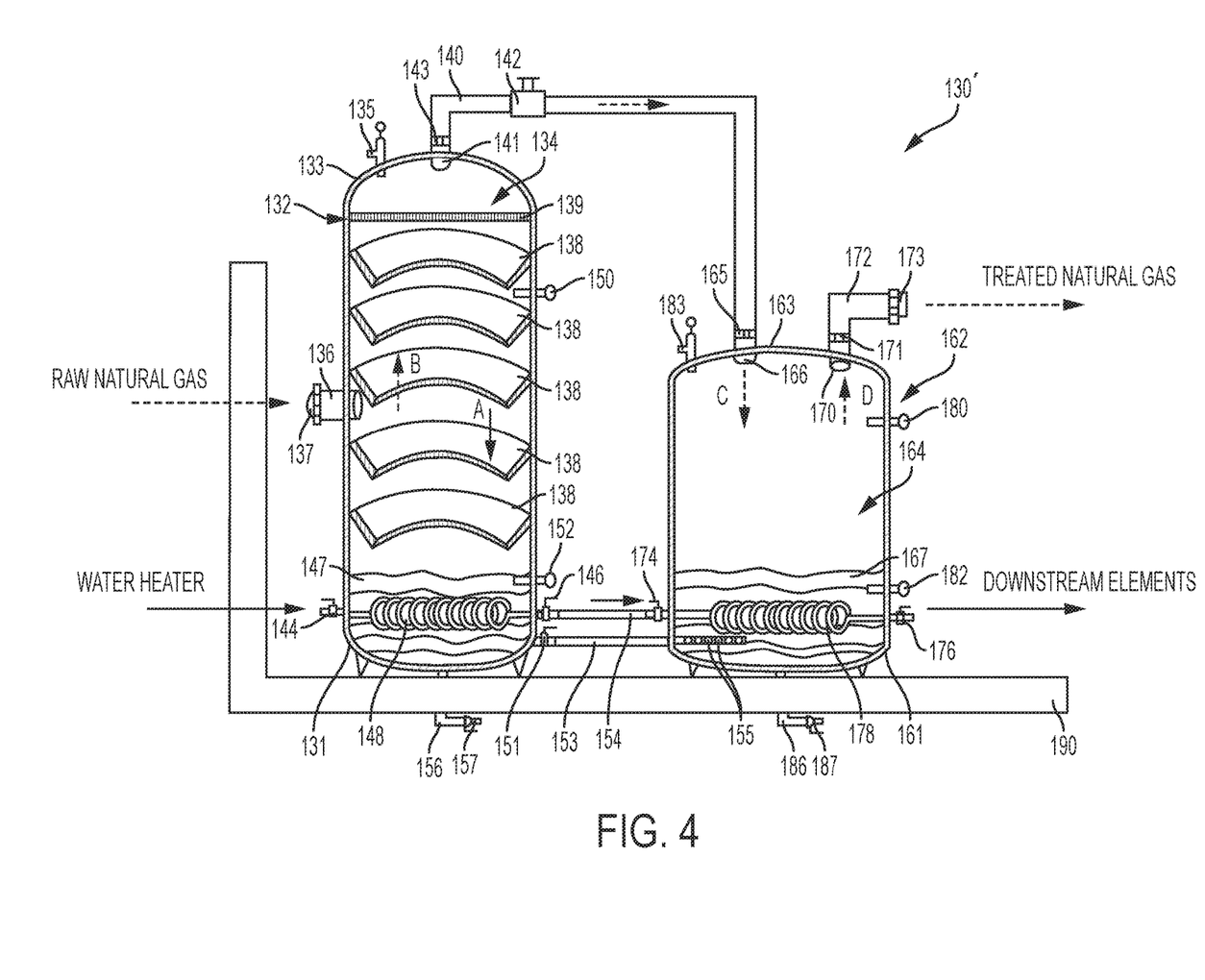
FIG. 4 is a cross-sectional schematic of the separation assembly of FIG. 3.

Referring now to FIGS. 3 and 4, an embodiment of the separation assembly 130' will be described. The separation assembly 130' generally comprises a vertical separation vessel 132 and a volume tank 162. In at least one embodiment, the tanks 132 and 162 may be supported on a platform 190 which may take the form, for example, of the bed of a truck, trailer or skid, or another type of moveable platform or other structure that can be positioned and left at a jobsite. The separation vessel 132 includes a natural gas inlet 136 with a connector 137 configured for connection to the raw natural gas supply piping 112 (as shown in FIGS. 1 and 2). The raw natural gas passes through both tanks 132, 162, as will be described in more detail hereinafter, and exits the volume tank 162 via an outlet pipe 172 with outlet port 170 and a connector 173. The connector 173 is configured for connection to the piping 114 (as shown in FIGS. 1 and 2) to deliver treated natural gas to the water heater 120. As illustrated in FIG. 3, a portion of the piping 104 may be supported on the optional platform 190 with connectors 111, 113 on each end thereof. The connectors 111, 113 are configured for connection to piping extending from the water heater 120 and to downstream elements, respectively. With the separation assembly 130' supported on a platform 190 and the various connectors 137, 173, 111, 113, the separation assembly 130' is easily transportable and can easily be hooked up at existing jobsites, replacing (or at least partially supplementing) the need for propane tanks or the like.

Referring to FIG. 4, the separation vessel 132 defines an internal chamber 134 extending from a lower end 131 and an upper end 133. In at least one embodiment, one or more fluid deflection devices are provided within the internal chamber 134. By way of non-limiting example, a series of mixing plates 138 (which may be a solid surface, screen, perforated material or combination thereof) may extend from the internal surface of the tank 132 such that the high pressure raw gas entering through the inlet 136 will impinge upon the mixing plates 138, causing entrained liquids 147 to fall out and travel toward the bottom of the tank, as indicated by arrow A, where they collect. Although an embodiment with multiple mixing plates 138 is shown, it is to be understood that this is but one possible embodiment. In another embodiment, no mixing plates are used. In yet another embodiment, a single mixing plate is used. By way of further example, 2, 3, 4, 5, 6, 7, 8, 9, 10 and upward to 100 or more mixing plates could be used.

To prevent the liquids 147 collected in the tank 132 from freezing, the separation vessel 132 has a heated water inlet valve 144 and a heated water outlet valve 146 with a portion of piping 148 extending therebetween. In the illustrated embodiment, the piping 148 is illustrated with a coiled configuration to facilitate more heat transfer, however, such may not be necessary depending on the application and the environmental conditions. The inlet valve 144 is configured for connection to piping 108 such that heated water from water heater 120 may be passed through the internal piping 148 of the separation vessel 132, thereby maintaining a desired temperature of the liquids 147. A temperature sensor 152 may extend into the internal chamber 134 to monitor the temperature of the liquid 147. The inlet valve 144 may be adjusted to adjust the amount of heated water to achieve a desired temperature. The outlet valve 146 is connected to piping 154 which connects to an inlet valve 174 of the volume tank 162, as will be described in more detail hereinafter.

To monitor the level of liquid 147 in the separation vessel 132, in one embodiment, an external sight glass tube 149 (as shown in FIG. 3) is open to the chamber 134 such that the level in the chamber 134 is equal to that in the tube 149. As those skilled in the art will appreciate, other devices for measuring the fluid level may also be employed. To reduce the volume of liquid 147, in at least one embodiment a drain pipe 156 extends from the bottom end 131 of the separation vessel 132 with a valve 157 configured to facilitate draining as desired.

The remaining gaseous portion moves upwardly, as indicated by arrow B, toward the upper end 133 of the tank 132. The gaseous portion passes through a screen 139 as it travels toward an intermediate outlet 141. In one embodiment, the screen 139 is preferably manufactured from a corrosion resistant material, for example, stainless steel, and removes further particles and compounds from the remaining gaseous portion. A pressure relief valve 135 is positioned toward the upper end 133 of the tank 132 and is configured to release pressure from the chamber 134 if the pressure therein exceeds a threshold value. A pressure gauge 150 may also extend into the chamber 134 to facilitate monitoring of the pressure therein.

The gaseous portion travels out of the intermediate outlet to connection piping 140 which extends between the upper end 133 of the separation vessel 132 and the upper end 163 of the volume tank 162. Further filter screens 143, 165 may be provided in each end of the piping 140.

In at least one embodiment, a pressure regulator 142 is positioned along the piping 140 to regulate the pressure of the gaseous portion entering the volume tank 162. For example, the pressure regulator 142 may be set such that the pressure entering the volume tank 162 is 150 psi or less.

The gaseous portion enters into the internal chamber 164 of the volume tank 162 via an inlet 166, as indicated by arrow C. The internal chamber 164 of the volume tank 162 preferably has a diameter larger than that of the internal chamber 134 of the separation vessel 132 such that as the gaseous portion enters, the pressure thereof is further reduced. A pressure gauge 180 may extend into the chamber 164 to facilitate monitoring of the pressure therein. A pressure relief valve 183 is positioned toward the upper end 163 of the tank 162 and is configured to release pressure from the chamber 164 if the pressure therein exceeds a threshold value.

Liquid 167 in the bottom of the volume tank 162 further acts to cool, and thereby condense the gaseous portion which further reduces the pressure thereof and also causes further liquid and other compounds to precipitate or fall out of the gas. As such, treated gas rises, as indicated by arrow D, to the upper end 163 of the chamber 164 toward the outlet port 170 and into the outlet pipe 172. Again, a screen 171 may be positioned in the pipe 172. The treated gas is delivered from the outlet pipe 172 to the piping 114 (as shown in FIGS. 1 and 2) from which it is delivered to the water heater 120 (as shown in FIGS. 1 and 2).

In accordance with at least one embodiment, to ensure or otherwise control the amount of liquid 167 present in the chamber 164, a liquid connection pipe 153 extends from an outlet valve 151 on the bottom end 131 of the separation vessel 132 into the internal chamber 164 of the volume tank 162. A series of holes 155 in the liquid connection pipe 153 allow liquid 147 in the separation vessel 132 to flow into the volume tank 162 when the valve 151 is opened. To monitor the level of liquid 167 in the volume tank 162, in one embodiment, an external sight glass tube 169 is open to the chamber 164 such that the level in the chamber 164 is equal to that in the tube 169. To reduce the volume of liquid 167, a drain pipe 186 extends from the bottom end 161 of the volume tank 162 with a valve 187 configured to facilitate draining as desired.

To maintain the temperature of the liquids 167 in the volume tank 162 at a desired level, the volume tank 162 has a heated water inlet valve 174 and a heated water outlet valve 176 with a portion of piping 178 extending therebetween. In the illustrated embodiment, the piping 178 is illustrated with a coiled configuration to facilitate more heat transfer, however, such may not be necessary depending on the application and the environmental conditions. The inlet valve 174 is configured for connection to the piping 154 such that heated water exiting the separation vessel 132 may be passed through the internal piping 178 of the volume tank 162, thereby maintaining a desired temperature of the liquids 167. A temperature sensor 182 may extend into the internal chamber 164 to monitor the temperature of the liquid 167. The inlet valve 174 may be adjusted to adjust the amount of heated water to achieve a desired temperature. The outlet valve 176 is connected to piping 109 which connects the downstream elements. As explained above, the outlet valve 176 may be otherwise connected such that the exiting water may be delivered elsewhere.

In an alternative configuration, heated water provided to the volume tank 162 may be provided separately from the heated water provided to the separation vessel 132. That is, heated water provided to internal piping 148 of the separation vessel 132 may be directed away from the volume tank 162, while a separate line of heated water is provided to volume tank 162 and to internal piping 178 residing therein. Optionally, if heated water is provided separately to the separation vessel 132 and the volume tank 162, then water flowing through the respective internal piping 148, 178 of the separation vessel 132 and volume tank 162 may be later rejoined downstream of the volume tank 162.

In yet another alternative embodiment, heated water may be provided first to the internal piping 178 of the volume tank 162 from the water heater, and then flow to the internal piping 148 of the separation vessel 132. Thus, several different configurations for the piping of hot water to the tanks 132, 162 of the separation assembly are contemplated and form different embodiments of the one or more present inventions.

In one embodiment, heated water is only provided to the gas separation vessel 132 and not to the volume tank 162 (wherein fluids from the separation vessel 132 are heated such that upon flowing to the volume tank 162, the fluids prevent freezing within the volume tank 162).

As those skilled in the art will appreciate, an oil and/or gas production well may, depending upon conditions, be treated with hot oil to enhance the production characteristics of the oil and/or gas production well. An alternative embodiment of the separation assembly includes the use of heated oil passing through at least one of the separation vessel 132 and volume tank 162 to provide heat to the interior of the separation vessel 132 and/or volume tank 162. Accordingly, while use of hot water in a hydraulic fracturing process comprises one embodiment, those skilled in the art will understand that other applications for the separation assembly exist, including but not limited to, use of the separation assembly to provide treated gas to the hot oil heater in a hot oil treatment system, wherein heated oil (or a liquid other than water) is used to heat liquids in the lower end 131 of the separation vessel 132 and/or volume tank 162.

Referring now to FIG. 5, in another embodiment, a separation assembly 130" is shown wherein a separation vessel 132 is provided and a volume tank is not provided. More particularly, depending upon the quality of the raw natural gas entering the separation vessel 132, the raw natural gas may be processed sufficiently within the separation vessel 132 to be used as treated gas by the heater of the frac water heater (or the heater of the hot oil heater and/or other downstream elements) without further processing by a volume tank. As described above, a heated fluid, such as heated water from a frac water heater, is used to heat fluids within the bottom of the separation vessel 132. Treated gas from the separation vessel 132 of separation assembly 130" is piped to the frac water heater 120 (as shown in FIGS. 1 and 2) (or the heater of the hot oil heater and/or other downstream elements) for use as a fuel.

Figure 6:
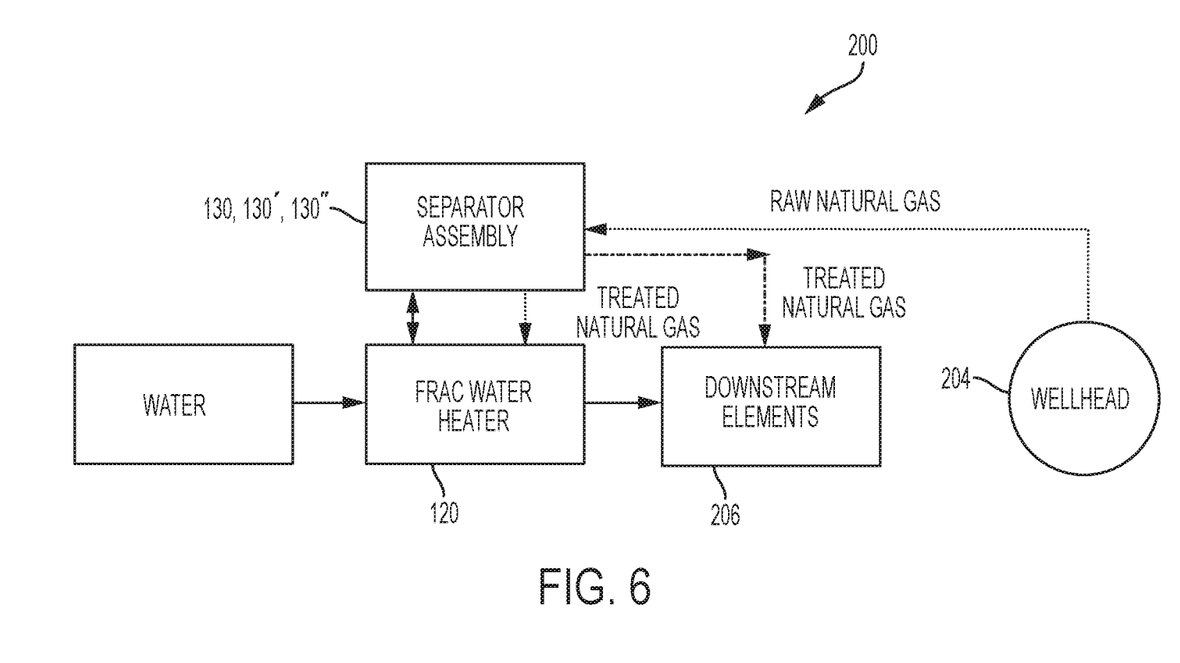
FIG. 6 is a schematic depicting one embodiment used in connection with one possible configuration of equipment at a wellhead site.

Referring now to FIG. 6, a schematic of an embodiment pertaining to one possible configuration of a project site 200 is shown. More particularly, project site 200 includes a wellhead 204 that provides raw natural gas to the separation assembly 130, 130', 130" and then flows as treated gas to the water heater 120, which in turn, uses the treated gas to heat water that flows to the separation vessel and the volume tank (if present) of the separation assembly 130, 130', 130". As those skilled in the art will appreciate, an alternative initial fuel source (e.g., propane from a propane tank operatively associated with the water heater 120) may be needed to initially heat water to provide the heated water to the separation assembly 130, 130', 130". However, after treated gas is produced from the separation assembly 130, 130', 130", then the treated gas may be used as the fuel for heating water at the water heater 120, including heating water that heats the separation vessel and the volume tank (if present) of the separation assembly 130, 130', 130". In addition, the treated natural gas may be conveyed, such as by gas piping, to downstream elements 206 that use the treated gas as fuel.

Figure 7:
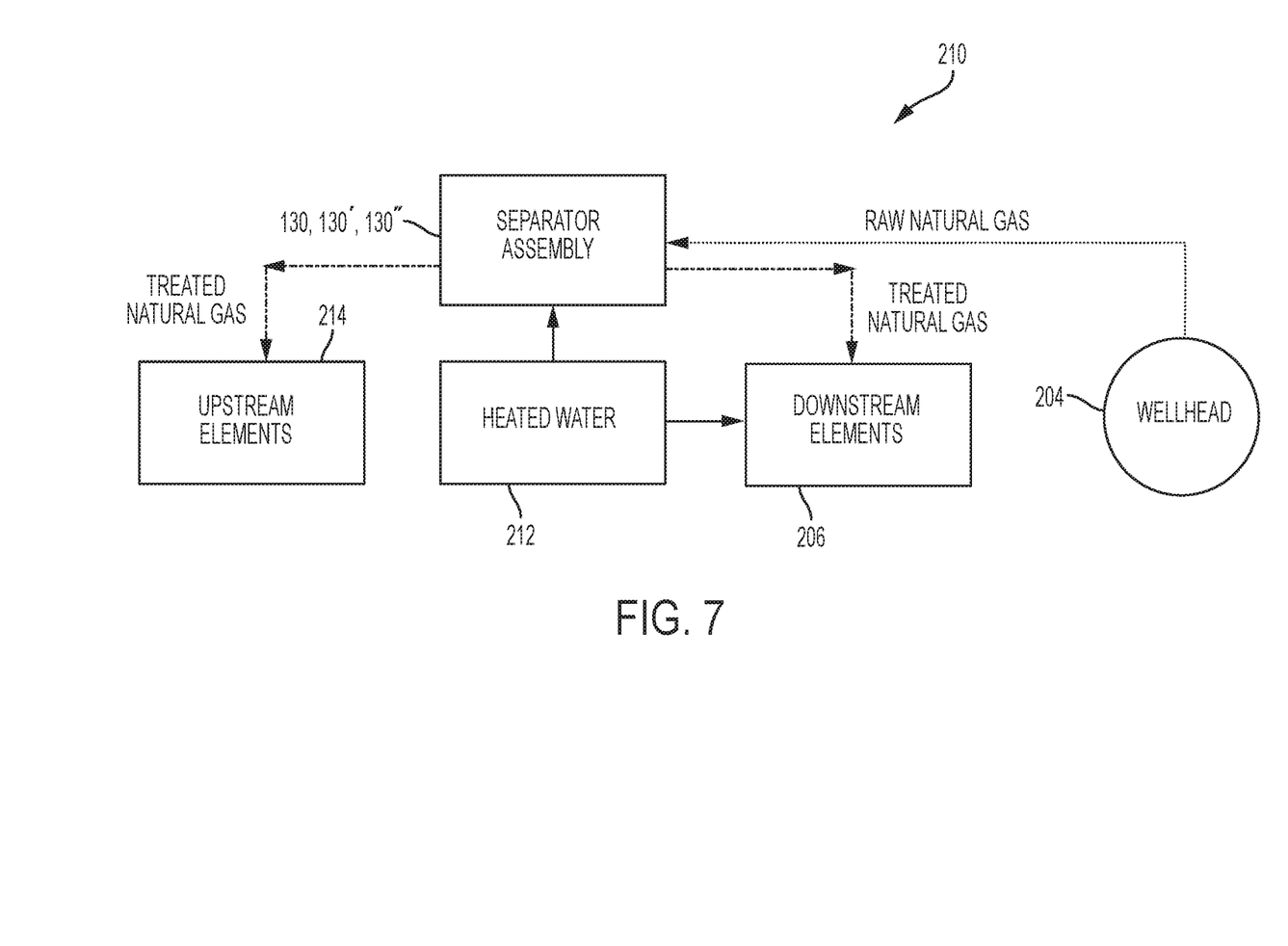
FIG. 7 is a schematic depicting one embodiment used in connection with one possible configuration of equipment at a wellhead site.

Referring now to FIG. 7, a schematic of an embodiment pertaining to one possible configuration of a project site 210 is shown. More particularly, similar to project site 200, project site 210 includes a wellhead 204 that provides raw natural gas to the separation assembly 130, 130', 130". However, with regard to the embodiment shown as project site 210, heated water 212 may exist on site; that is, as those skilled in the art will appreciate, heated water 212 may pumped to the project site and/or exist on site and/or otherwise be preheated and stored in frac water tanks (or other water containment structures, such as, by way of example, ponds, pools or membrane lined impoundments). At least a portion of such heated water 212 may then be routed through the separation vessel and the volume tank (if present) to heat fluids within the separation vessel and volume tank (if present). After treated natural gas is produced from the separation assembly 130, 130', 130", then the treated natural gas may be conveyed through gas piping and used as fuel for upstream elements 214 and/or downstream elements 206, such as to fuel generators for powering pumps or other equipment. Moreover, treated natural gas may also be used as fuel for a frac water heater (not shown in FIG. 7), even though the heated water for heating fluids within the one or more tanks of the separation assembly 130, 130', 130" is not from the frac water heater, but is from water that is pumped to the project site and/or exists on site and/or is otherwise preheated and stored in frac water tanks (or other water containment structures, such as ponds, pools or membrane lined impoundments).

As those skilled in the art will appreciate, treated natural gas from the separation assembly 130, 130', 130" may be used for purposes other than to fuel the frac water heater or hot oiler. More particularly, upstream and/or downstream elements from the separation assembly 130, 130', 130" may include equipment that can use the treated natural gas, such as: (1) generators; (2) light plants; and (3) water pumps. Alternatively, hydraulic fracturing equipment (including, but not limited to, frac pumps, blenders, hydration units and other support equipment) may be fueled directly or indirectly using treated gas from the separation assembly.

The one or more present inventions may be embodied in other specific forms without departing from its spirit or essential characteristics. The described embodiments are to be considered in all respects only as illustrative and not restrictive. The scope of the one or more present inventions is, therefore, indicated by the appended claims rather than by the foregoing description. All changes which come within the meaning and range of equivalency of the claims are to be embraced within their scope.

The one or more present inventions, in various embodiments, includes components, methods, processes, systems and apparatus substantially as depicted and described herein, including various embodiments, subcombinations, and subsets thereof. Those of skill in the art will understand how to make and use the one or more present inventions after understanding the present disclosure.

The one or more present inventions, in various embodiments, includes providing devices and processes in the absence of items not depicted and/or described herein or in various embodiments hereof, including in the absence of such items as may have been used in previous devices or processes (e.g., for improving performance, achieving ease and/or reducing cost of implementation).

The foregoing discussion of the one or more present inventions has been presented for purposes of illustration and description. The foregoing is not intended to limit the one or more present inventions to the form or forms disclosed herein. In the foregoing Detailed Description for example, various features of the one or more present inventions are grouped together in one or more embodiments for the purpose of streamlining the disclosure. This method of disclosure is not to be interpreted as reflecting an intention that the claimed one or more present inventions requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the one or more present inventions.

Moreover, though the description of the one or more present inventions has included description of one or more embodiments and certain variations and modifications, other variations and modifications are within the scope of the one or more present inventions (e.g., as may be within the skill and knowledge of those in the art, after understanding the present disclosure). It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A frac water heating system including a gas separator for treating a raw natural gas conveyed via raw natural gas piping from a raw natural gas supply, comprising:
   a separation assembly including at least a separation vessel, the separation vessel defining an internal chamber having an upper end and lower end, the separation vessel having a gas inlet configured for interconnection to the raw natural gas supply piping, the separation vessel having a gas outlet, wherein the separation vessel is configured such that raw natural gas entering through the gas inlet is treated within the separation vessel such that at least some liquid associated with the raw natural gas collects in the lower end of the internal chamber and a treated gas travels to and out of the gas outlet;
   a frac water heater having a water inlet and a heated water outlet, the frac water heater having a heater configured to heat water passing from the water inlet to the heated water outlet, the heater configured to utilize at least a portion of the treated gas exiting the separation vessel;
   gas conveyance piping located between the gas outlet of the separation vessel and a gas inlet to the heater of the frac water heater; and
   water conveyance piping in fluid communication with the heated water outlet of the frac water heater and passing through the lower end of the separation vessel, the water conveyance piping located in the lower end of the separation vessel configured to heat liquid collected within the lower end of the internal chamber of the separation vessel.

2. The frac water heating system of claim 1, wherein the separation assembly further comprises a volume tank defining an internal chamber, wherein the volume tank is situated along the gas conveyance piping downstream of the gas outlet of the separation vessel and upstream of the gas inlet to the heater of the frac water heater, wherein the volume tank includes a volume tank gas inlet configured to receive the treated gas from the gas conveyance piping, the internal chamber of the volume tank configured to temporarily hold gas and/or liquids therein and optionally to reduce a pressure of the treated gas before the treated gas exits through a volume tank gas outlet which is in fluid communication with the gas conveyance piping leading to the gas inlet of the frac water heater.

3. The frac water heating system of claim 2, further comprising water conveyance piping between the separation vessel hot water outlet and the volume tank hot water inlet for conveying hot water from the separation vessel to the volume tank.

4. The frac water heating system of claim 3, further comprising a first valve associated with the water conveyance piping and located upstream of a hot water inlet to the separation vessel.

5. The frac water heating system of claim 4, further comprising a second valve associated with the water conveyance piping and located between the separation vessel and the volume tank.

6. The frac water heating system of claim 5, wherein the separation assembly in located on a mobile platform.

7. The frac water heating system of claim 6, further comprising additional water conveyance piping located exterior to the separation vessel and the volume tank, wherein the additional water conveyance piping is located on the mobile platform and extends from a location upstream of the separation vessel to downstream of the volume tank.

8. The frac water heating system of claim 7, wherein the mobile platform comprises at least one of a truck, a trailer, and a skid.

9. A separation assembly to treat a raw natural gas conveyed via raw natural gas supply piping from an oil and gas well, the separation assembly for use in combination with a frac water heater associated with a hydraulic fracturing treatment process of a subsurface geologic feature, the frac water heater including a frac water heater gas inlet, the separation assembly comprising:
  a separation vessel, the separation vessel defining an internal chamber having an upper end and a lower end, the separation vessel having a gas inlet configured for connection to the raw natural gas supply piping and a gas outlet for releasing partially treated gas, the separation vessel including a separation vessel hot water inlet and a separation vessel hot water outlet with separation vessel internal piping in the lower end of the internal chamber, the separation vessel internal piping interconnecting the separation vessel hot water inlet and the separation vessel hot water outlet; and
  a volume tank including a volume tank gas inlet configured to receive the partially treated gas exiting the gas outlet of the separation vessel, the volume tank including a volume tank internal chamber having an upper end and a lower end, the volume tank including a volume tank hot water inlet and a volume tank hot water outlet with volume tank internal piping in the lower end of the volume tank internal chamber, the volume tank internal piping interconnecting the volume tank hot water inlet and the volume tank hot water outlet, the volume tank including a volume tank gas outlet to release treated gas.

10. The separation assembly of claim 9, further comprising gas piping extending between the volume tank gas outlet and the frac water heater gas inlet.

11. The separation assembly of claim 9, further comprising hot water piping interconnecting the separation vessel hot water outlet to the volume tank hot water inlet for conveying hot water between the separation vessel and the volume tank.

12. The separation assembly of claim 11, further comprising a first valve in line with the separation vessel hot water inlet and located upstream of the separation vessel hot water inlet.

13. The separation assembly of claim 12, further comprising a second valve in line with the volume tank hot water inlet and located between the separation vessel and the volume tank.

14. The separation assembly of claim 13, wherein the separation vessel and the volume tank are both located on a mobile platform.

15. The separation assembly of claim 14, further comprising water conveyance piping located exterior to the separation vessel and the volume tank, wherein the water conveyance piping is located on the mobile platform and extends from a location upstream of the separation vessel to downstream of the volume tank.

16. The separation assembly of claim 15, wherein the mobile platform comprises at least one of a truck, a trailer, and a skid.

17. A method of heating frac water using natural gas, comprising:
  passing water through a frac water heater from a water inlet to a heated water outlet;
  heating the water with a heater in the frac water heater configured to heat water passing from the water inlet to the heated water outlet, the frac water heater utilizing treated gas received through a gas inlet as fuel;
  passing raw natural gas through a separation assembly comprising at least a separation vessel, wherein the separation vessel defines an internal chamber having an upper end and a lower end, the separation vessel configured such that at least a portion of liquid within the raw natural gas collects in the lower end of the internal chamber and a partially treated gas travels out of the separation vessel;
  passing at least a portion of the partially treated gas exiting the separation assembly to the gas inlet of the frac water heater; and
  passing at least a portion of heated water exiting the heated water outlet through the lower end of the separation vessel to heat liquid collected within the lower end of the internal chamber.

18. The method of claim 17, further comprising passing heated water from the separation vessel through a pipe within a volume tank, the volume tank forming a portion of the separation assembly.

19. The method of claim 18, further comprising water conveyance piping located exterior to the separation vessel and the volume tank, wherein the water conveyance piping is located on a mobile platform, the water conveyance piping extending from a location upstream of the separation vessel to downstream of the volume tank.

20. The method of claim 17, wherein the separation vessel includes a plurality of mixing plates and/or screens extending into the internal chamber, and wherein the raw natural gas passes through, around, adjacent and/or otherwise contacts the plurality of mixing plates and/or screens.

* * * * *